Nov. 24, 1936.　　　H. R. BERARD　　　2,061,823
BOTTLE LABELING MACHINE
Filed July 8, 1935　　　8 Sheets-Sheet 1

INVENTOR
HECTOR R. BERARD
BY Chas H Richards
HIS ATTORNEY

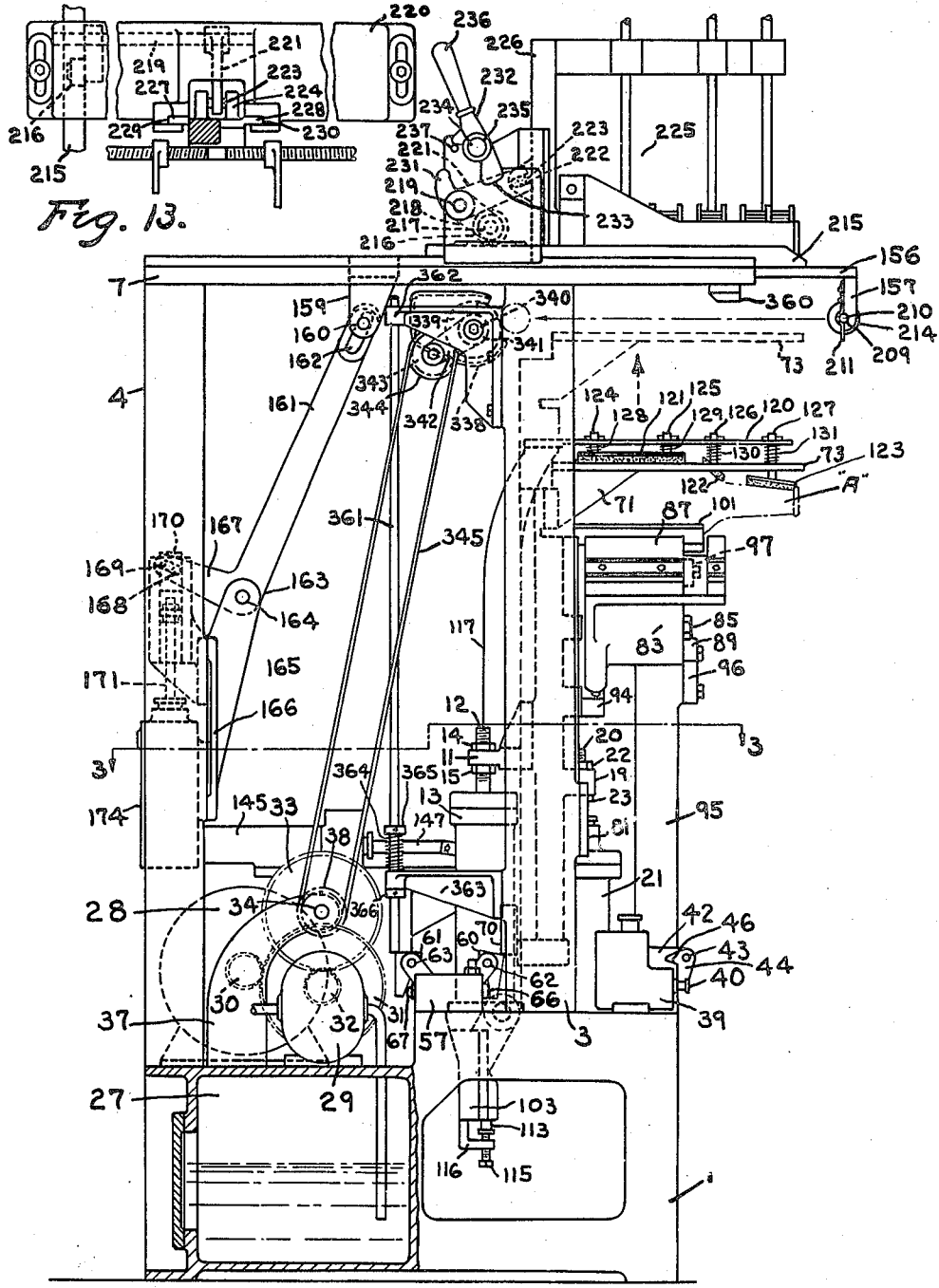

Nov. 24, 1936.  H. R. BERARD  2,061,823
BOTTLE LABELING MACHINE
Filed July 8, 1935  8 Sheets-Sheet 3

INVENTOR
HECTOR R. BERARD
BY Chas. H. Richards
HIS ATTORNEY

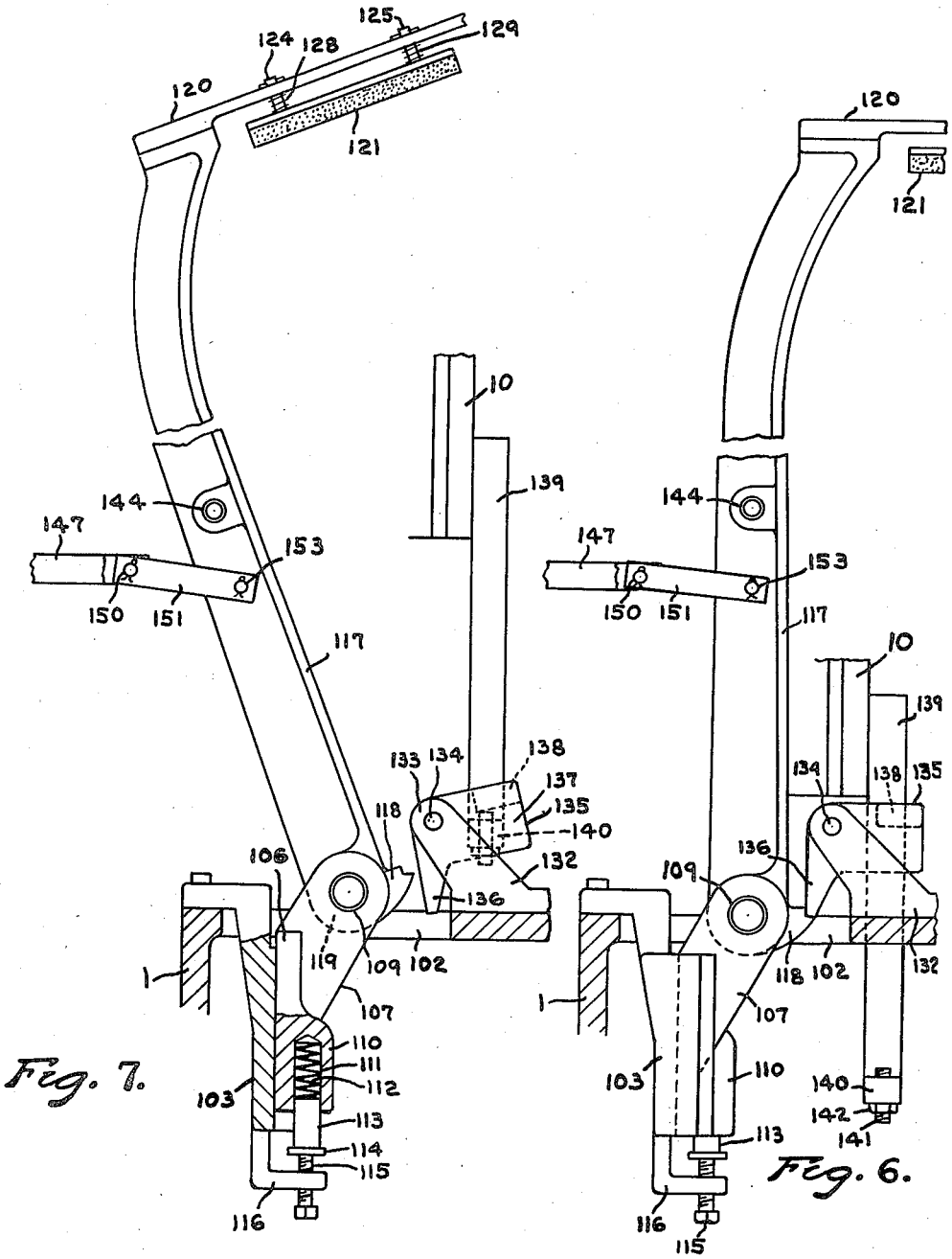

Nov. 24, 1936.  H. R. BERARD  2,061,823
BOTTLE LABELING MACHINE
Filed July 8, 1935  8 Sheets-Sheet 5

INVENTOR
HECTOR R. BERARD
BY Chas H. Richards
HIS ATTORNEY

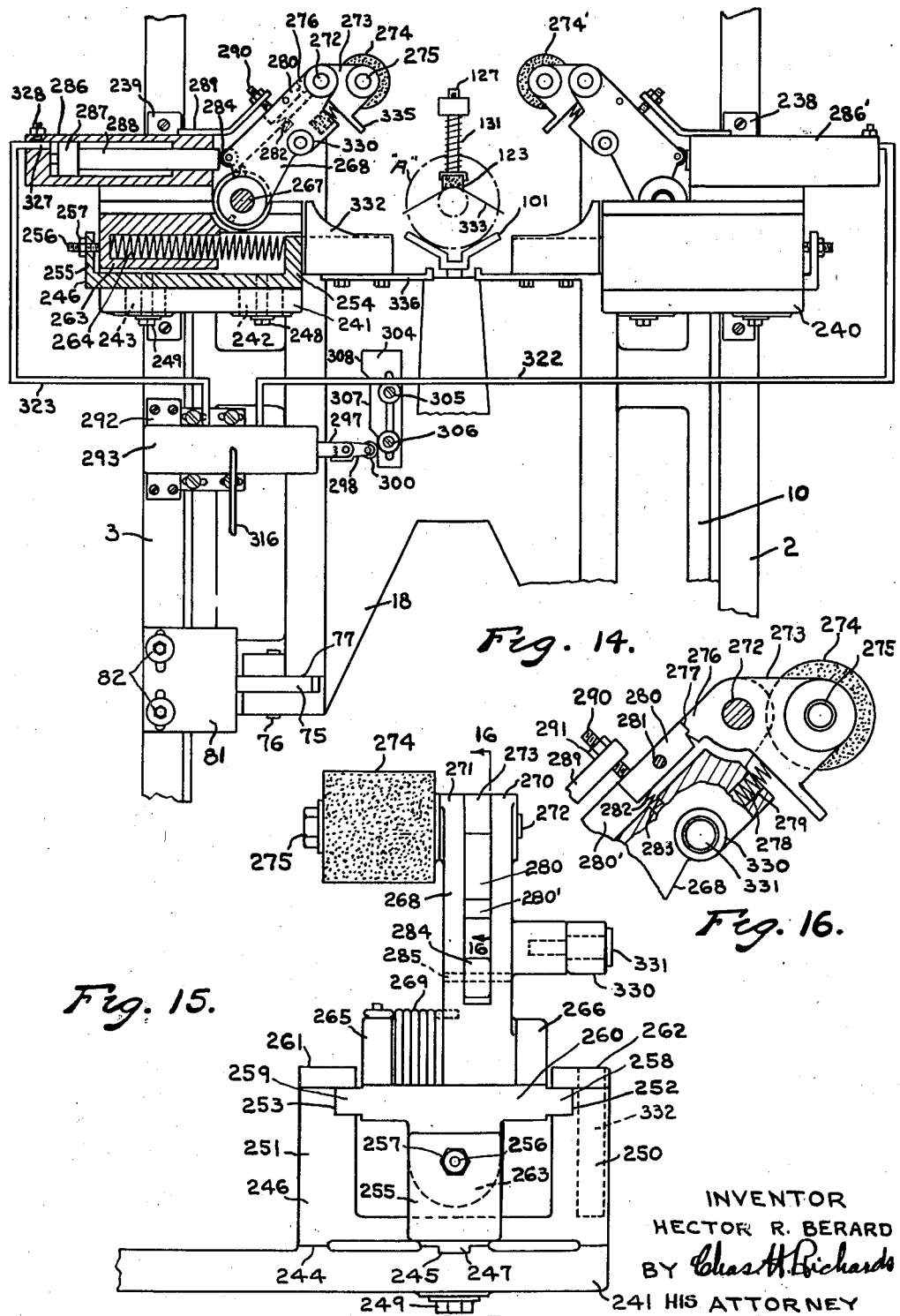

INVENTOR
HECTOR R. BERARD
BY Chas. H. Richards
HIS ATTORNEY

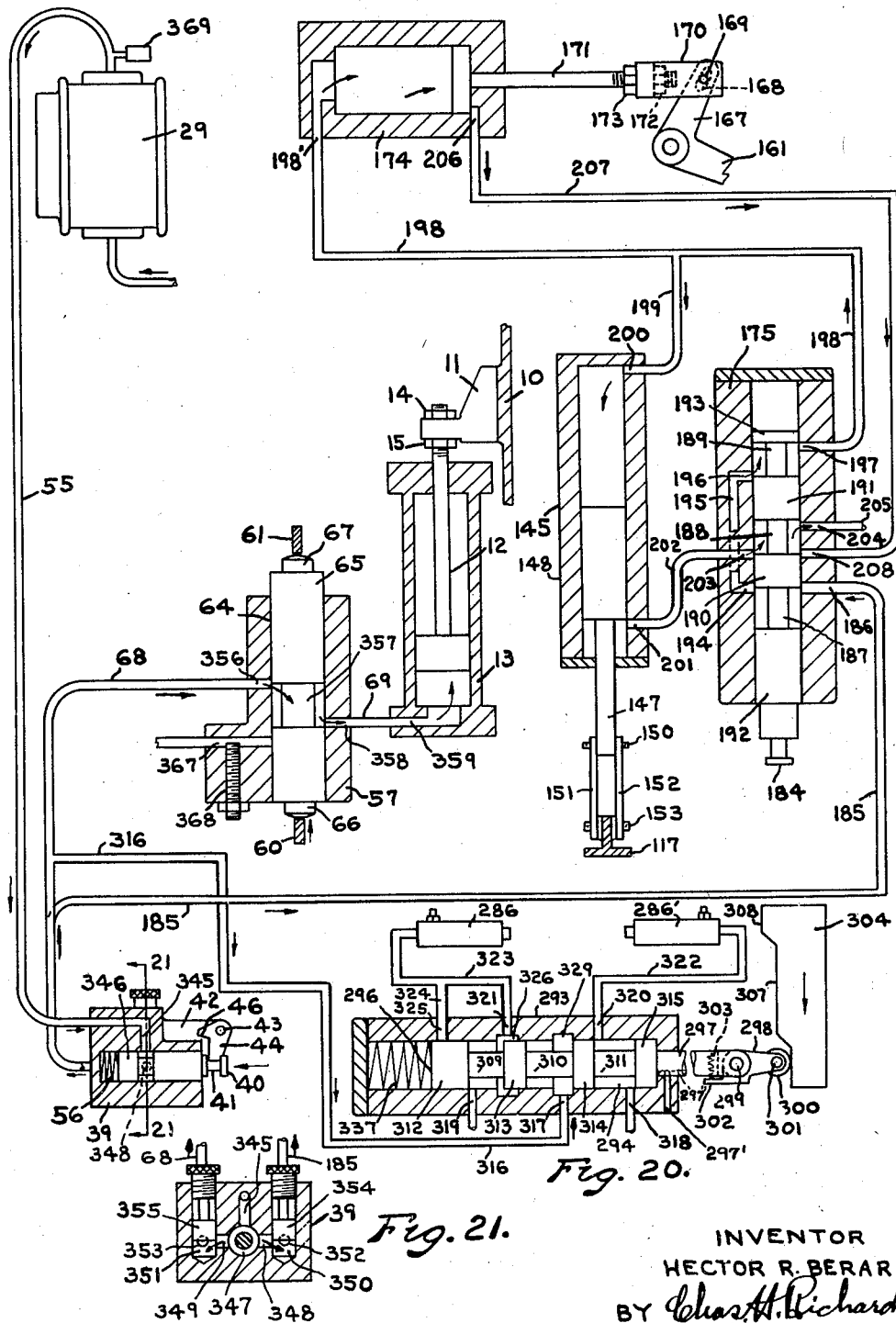

Patented Nov. 24, 1936

2,061,823

UNITED STATES PATENT OFFICE 2,061,823

BOTTLE LABELING MACHINE

Hector R. Berard, Worcester, Mass.

Application July 8, 1935, Serial No. 30,219

37 Claims. (Cl. 216—54)

This improvement relates to bottle labeling machines in general and particularly to such machines in which the various units are actuated by fluid under pressure.

The object of the present invention is to provide certain features of novelty and advantages in machines of this type whereby their range of usefulness and effectiveness is increased; and more particularly to provide a machine of such construction and arrangement that it may operate efficiently and quietly with a minimum of wearing parts.

Further objects and advantages will more fully appear from the following detailed description which, taken together with the accompanying drawings, illustrates some embodiments of said invention:—

Fig. 2 is a side elevational view of the machine.

Fig. 6 is a side elevation showing the strip finger in vertical or operative position.

Fig. 7 shows the strip finger in non-operative position.

Fig. 13 is a plan view partially in section showing the label box actuating mechanism.

Fig. 14 is a front elevation of the machine having a foil wrapping mechanism attached thereto.

Fig. 15 is a rear view of a foil wrapper arm mechanism.

Fig. 16 is a sectional view of a foil wrapper roll and arm taken on line 16—16 of Fig. 15.

Figure 17:
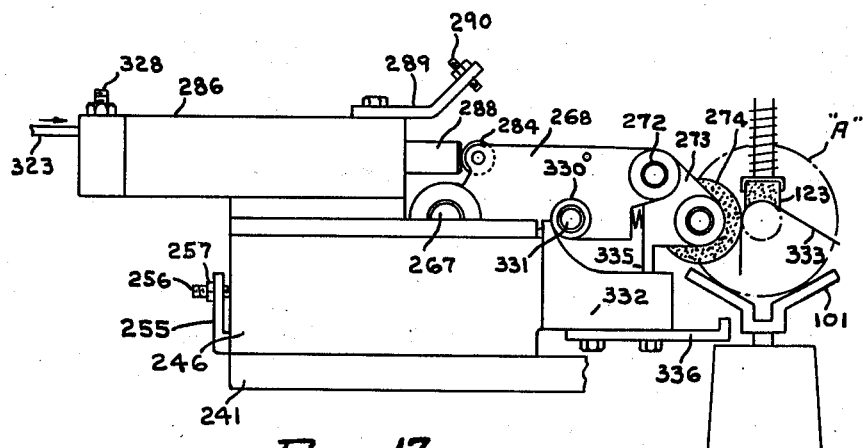
Figure 18:
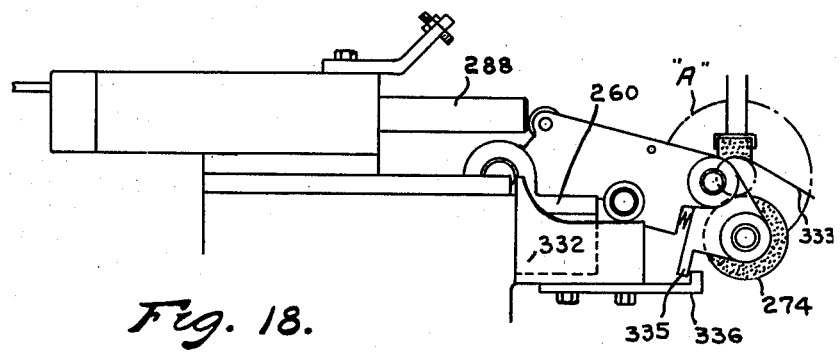
Figure 19:
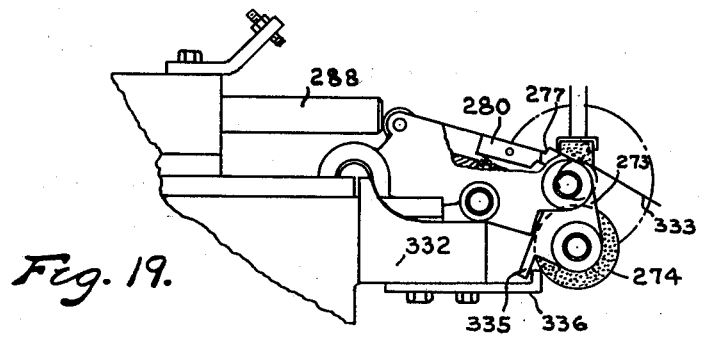

Figs. 17, 18, and 19 are views of the foil wrapper mechanism in various positions of operation.

Fig. 20 is a piping diagram for the fluid under pressure.

Fig. 21 is a section taken on line 21—21 of Fig. 20 showing the adjustable throttle valves.

Like reference characters refer to like parts in the different figures.

Figures 1, 5:
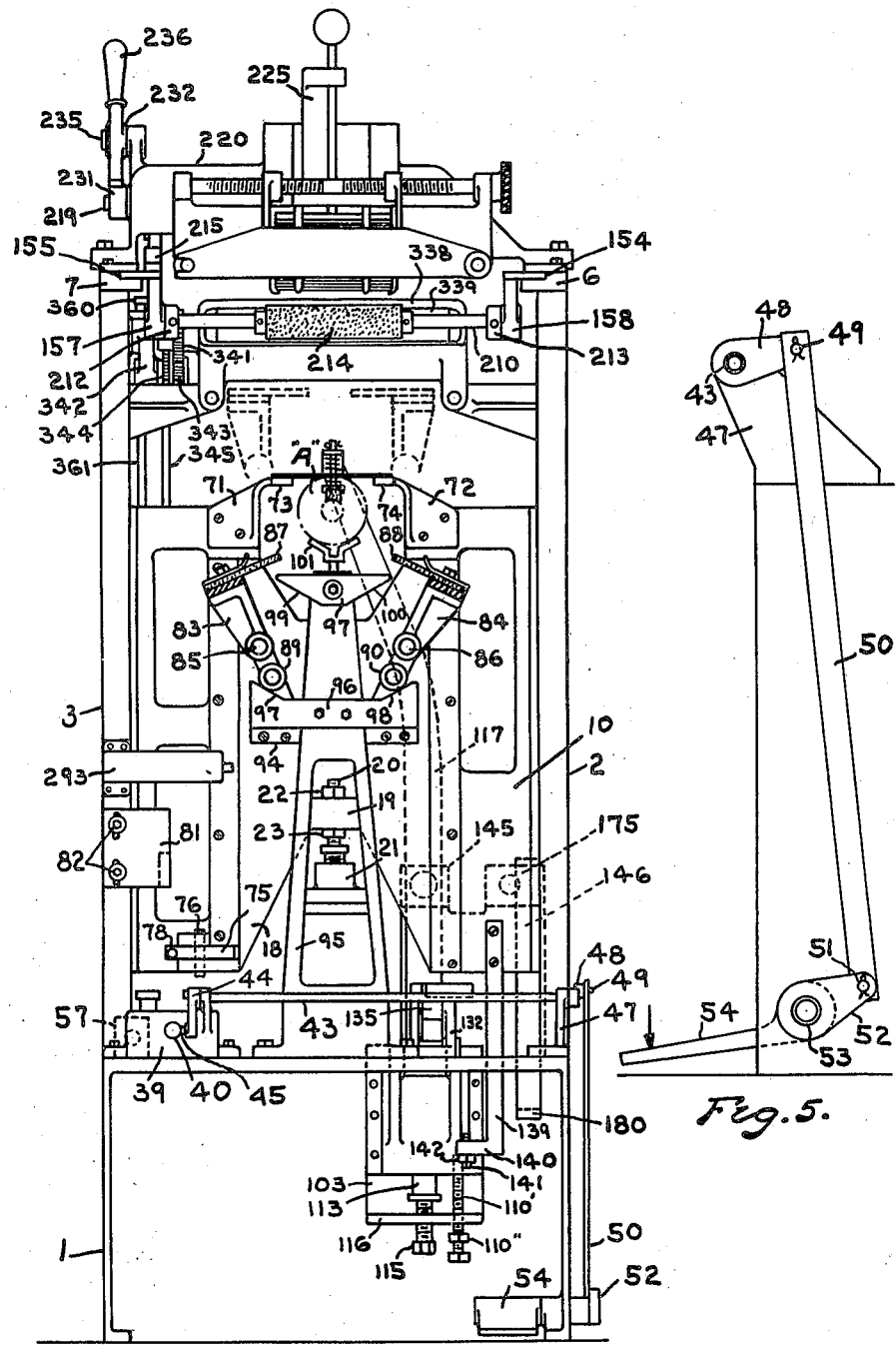
Fig. 1 is a front elevational view of the machine embodying the invention.
Fig. 5 is a partial side elevation showing the control lever.

Referring first to Figs. 1 and 2 the machine consists of a base 1 having upright members 2, 3, 4 and 5 on the upper end of which are attached cross members 6 and 7. The front upright members 2 and 3 have slide ways 8 and 9 respectively, Fig. 3, in which is slidably mounted a reciprocable slide member 10.

The main slide member 10 has a projecting bracket 11 to which is attached a piston rod 12 which extends through one end of a hydraulic cylinder 13, said cylinder being mounted on the base 1. The end of the piston rod 12 is screw threaded in order that nuts 14 and 15 can be used on opposite sides of the bracket 11 whereby the slide 10 may be adjusted in order to insure the said slide moving to the correct upper position in relation to the rest of the machine.

Figure 12:
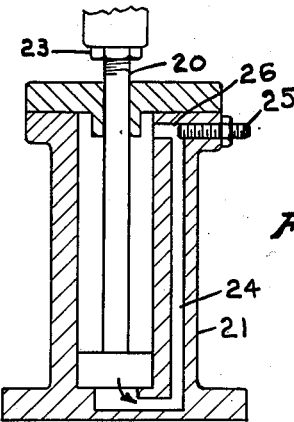
Fig. 12 is a sectional view of the dash pot for the wiper slide.

The slide member 10 also has slide ways 16 and 17 in which is slidably mounted a slide member 18 said member having a projecting boss 19 with a hole therein for the threaded end of a piston rod 20 which extends through one end of a cylinder 21. Nuts 22 and 23 are screw threaded on the rod 20 so that they abut the top and bottom sides of the hub 19 respectively whereby the slide member 18 is adjustably secured to the said piston rod. The cylinder 21, Fig. 12, is shown to be a dash pot filled with fluid that flows from end to end through a passage 24. In order to control the downward movement of the slide 18 by the fluid in the cylinder 21 an adjustable needle valve 25 is placed in a passage 26, said passage forming the port through which the fluid enters the upper portion of the cylinder when the slide starts moving downwardly. By means of the needle valve 25 the passage 24 is more or less restricted whereby the rate of descent of the slide 18 is governed.

Figures 3, 4:
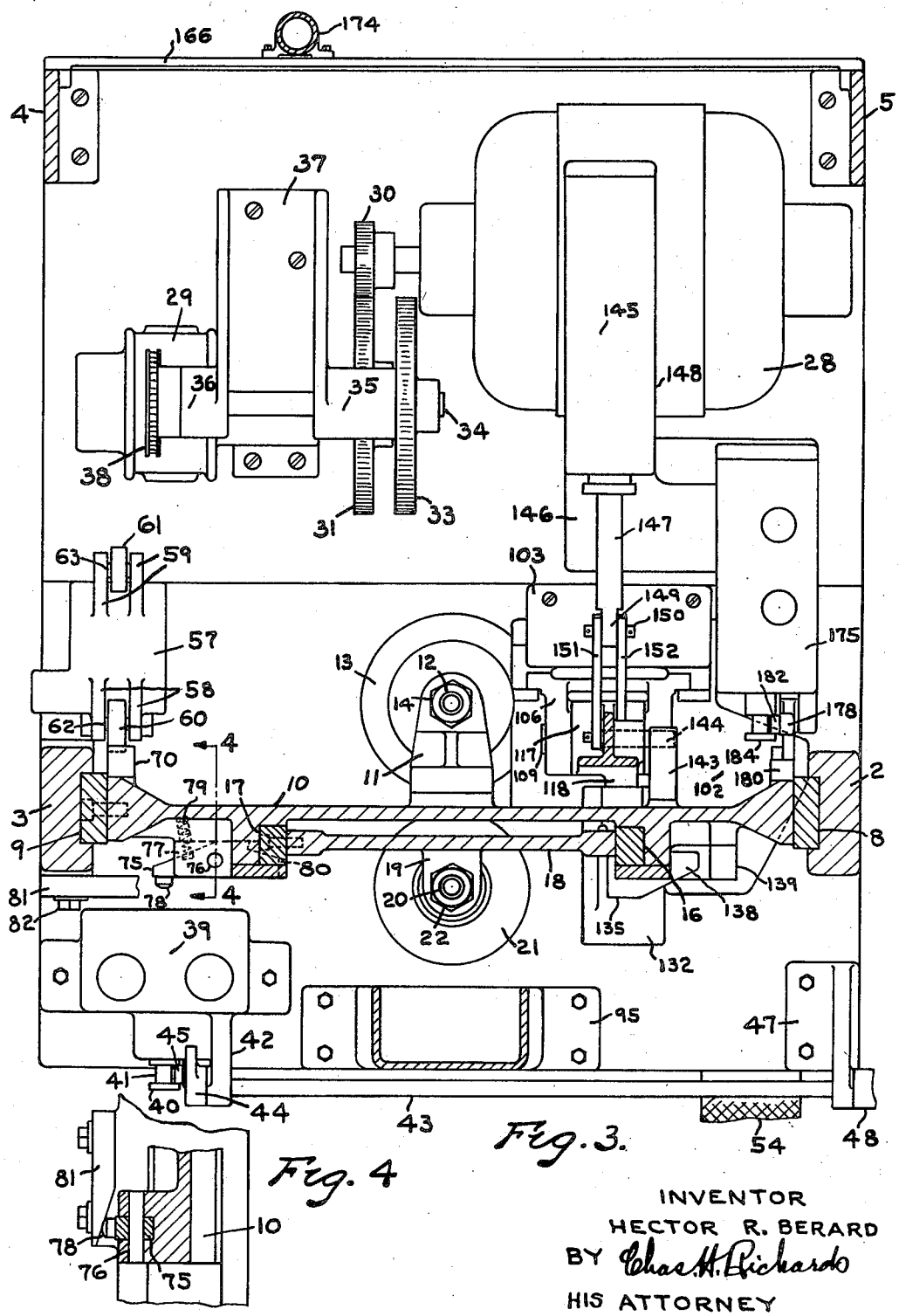
Fig. 3 is a partial plan section of the machine taken substantially on line 3—3 of Fig. 2.
Fig. 4 is a section taken on line 4—4 of Fig. 3.

Extending rearwardly of the base 1, Figs. 2 and 3, is an inclosed tank 27 which acts as a sump for the fluid used in the hydraulic system. Mounted on the tank 27 is a driving motor 28 and a pump 29 said motor and pump being geared together by gears 30 and 31. The gear 31 being mounted on the driving shaft, not shown, of the pump, said shaft also carrying a gear 32, Fig. 2, which drives a gear 33. The gear 33 is mounted on one end of a shaft 34 which is rotatably mounted in bearings 35 and 36 provided on a member 37, said member being mounted on and fastened to the tank 27. On the opposite end of the shaft 34 is a chain sprocket 38 the purpose of which will more clearly hereinafter appear.

Mounted on the front of the base 1, Figs. 1, 2, 3 and 5, is a valve casing 39 in which is slidably mounted a piston type valve member 40 which has a circumferential groove 41. The valve casing 39 has an arm 42 in which is a bearing for a rod 43 on one end of which is fastened a valve actuating member 44 having a projection 45 that fits the groove 41. The valve actuating member 44 has a stop member 46 to limit the movement of the valve member 40 in one direction.

The rod 43 extends across the front of the machine through a bearing in a bracket 47, said bracket being suitably fastened to the base 1. A lever 48, Figs. 1 and 5, non-rotatably fastened to the other end of the rod 43, carries a stud 49 upon which is rotatably mounted a link 50, the other end of said link being mounted upon a stud 51 carried by a lever 52. The lever 52 is non-rotatably fastened to one end of a rotatable shaft 53 on the other end of which is non-rotatably mounted a foot treadle 54.

As shown in the drawings the foot treadle 54 is in its downward or operative position whereby the fluid under pressure from the pump 29 flows by the way of pipe 55 through the main valve 39 to the rest of the system. When the treadle 54 is depressed by the operator's foot the valve member 40 is moved against the action of a spring 56, Fig. 20. As soon as the operator removes his foot from the treadle 54 the spring 56 will move the valve member 40 to the right as seen in Fig. 20 until it is stopped by the stop member 46 coming in contact with the top of the valve casing 39.

A reversing valve 57, mounted on the base 1 to the rear of the main slide 10, Figs. 2, 3 and 20, is provided with two pairs of arms 58 and 59 between each pair of which is mounted one of the oscillating members 60 and 61 respectively. The members 60 and 61 are mounted on shafts 62 and 63 which are rotatably mounted in bearings provided by the arms 58 and 59. The valve 57 has a central opening 64, Fig. 20, in which is slidably mounted a piston valve 65 having extensions 66 and 67 which are contacted by the members 60 and 61. A pipe 68 connects the main valve 39 with the reversing valve 57 and a pipe 69 connects the said reversing valve with main slide actuating cylinder 13.

As shown in the drawings the main slide 10 is in its lowermost position at which time an adjustable abutment member 70, on the rear of the main slide, is in contact with the oscillatable member 60 causing said member to rock about its fulcrum 62, and move the piston 65, toward the left, Fig. 2 or upwardly to the position shown in Fig. 20, so that fluid under pressure is being admitted at the bottom of the cylinder 13.

Attached to the upper end of the slide 10 is a pair of brackets 71 and 72 upon which are mounted members 73 and 74 respectively, said members forming a pair of picker fingers for removing labels from a source of supply.

The main slide 10 has mounted thereon, Figs. 1, 3 and 4, a latch member 75, fulcrumed at 76 in a slot 77, having a contact member 78. The latch 75 is held in latching position by a spring 79.

The slide 18, mounted in ways 16 and 17 on the main slide 10, is slotted at 80 to receive the latch member 75 when both slides are in their lowermost position so that when the main slide 10 moves upwardly the second slide 18 moves with it up to a predetermined position. The second slide 18 is released from the main slide 10 by means of a cam 81 adjustably fastened to the side frame 3 by means of screws 82.

Figure 9:
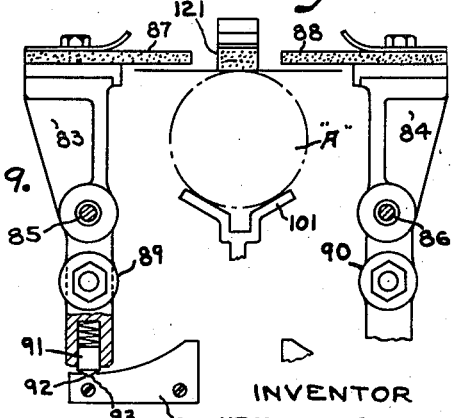
Fig. 9 is a front view of the wiper fingers in operative position.

A pair of arms 83 and 84, Figs. 1, 2 and 9, are fulcrumed at 85 and 86 on studs fastened in the second slide 18. On the upper end of each of the arms 83 and 84 is mounted a wiper pad 87 and 88 of resilient material so that when they wipe a label over a bottle they will press the said label firmly on the bottle without tearing or wrinkling it. Part way down on the wiper arm and below the fulcrum points 85 and 86 are rotatably mounted cam rollers 89 and 90. The lower end of each of the arms 83 and 84 is provided with a spring pressed detent 91 having a projecting portion 92, Fig. 9, which fits into a depression 93 formed in a guide member 94. The guide member 94, Figs. 2 and 9, is suitably fastened on the front of the second slide 18. There is a guide member for each of the arms 83 and 84 so that when the arms are in wiping position as shown in Fig. 9 the detent 91 will hold the said arms thus until moved to the position shown in Fig. 1.

A bottle stand 95, suitably mounted on the base 1, Figs. 1 and 2, has a pair of double cams 96 and 97 mounted on the front thereof, the cam 96 causing the arms 83 and 84 to assume the position shown in Fig. 1 when the rolls 89 and 90 contact the cam surfaces 97 and 98 respectively. The cam 97 causes the said arms to assume the position shown in Fig. 9 when the rolls 89 and 90 contact the cam surfaces 99 and 100. A suitably shaped member 101 is adjustably mounted in the upper end of the stand 95 whereby bottles "A" of various sizes and shapes can be suitably located in relation to the other parts of the machine.

The base 1 has an aperture 102, Figs. 3, 6, 7 and 11, on one edge of which is fastened a depending bracket 103. The bracket has ways 104 and 105 in which is slidably mounted a member 106, the said member also having a pair of bearing members 107 and 108 in which is rotatably mounted a short shaft 109. The member 106 has an extending boss 110 in which is a hole 111 having a spring 112 and plunger 113. The plunger 113 has an enlarged end 114 which abuts an adjustable stop 115, said stop being screw threaded in an L shaped, downwardly extending projection 116. The stop 115 governs the tension on the spring 112 when it is compressed by the slide 106 in its latched position. In order to govern the height to which the spring 112 moves the slide 106, after it is released from the latch, a screw threaded member 110′, Fig. 1, is fastened to said slide. The member 110′ extends through and below the projection 116 and has an adjustable abutment 110″, in the form of a nut, which limits the upward movement of said slide 110 by coming in contact with the under surface of the projection 116.

Securely fastened to the rotatable shaft 109 is a lever arm 117 having a projection 118 on its hub 119. On the upper end of the arm 117 is fastened a member 120, Figs. 1, 6 and 7, which carries one or more strip or presser pads 121, 122 and 123. The strip pads have projecting studs 124, 125, 126 and 127 extending through suitable holes in the member 120. Springs 128, 129, 130 and 131 surround the studs between the member 120 and the strip pads 121, 122 and 123 so that the said pads are resiliently spaced from said member. Cotter pins or other suitable means is provided to hold the said pads in attached relation to the member 120.

In front of the lever arm 117 is positioned a bracket 132, Figs. 6 and 7, having a hub portion 133 in which is non-rotatably mounted a stud 134. Rotatably mounted on the stud 134 is a latch member 135 having a downwardly extending arm 136 and a rearwardly extending portion 137 which has an extension 138 at right angles to the rearwardly extending portion 137. As shown in Fig. 6 the slide 106 is in its lowermost position at which time the arm 117 is in a vertical position. With the said slide and arm in this position the arm 136, of the latch member 135, is in contact with the projection 118 of the lever arm 117 thereby holding the said arm and its slide 106 against the action of the spring 112.

Attached to the main slide 10 is a latch actuating member 139, Figs. 1, 3, 6 and 7, having an angular projection 140 in which is screw threaded an adjustable stop 141 which is held in adjusted position by means of a check nut 142. When the slide 10 moves upwardly as will be more clearly hereinafter explained the stop member 141 will contact with the extension 138 of the latch member 135 and rock the said latch member to the position as shown in Fig. 7. Rocking the latch member 135 will release the lever arm 117 and allow the spring 112 to raise the slide 106 to its upper position.

Figure 8:
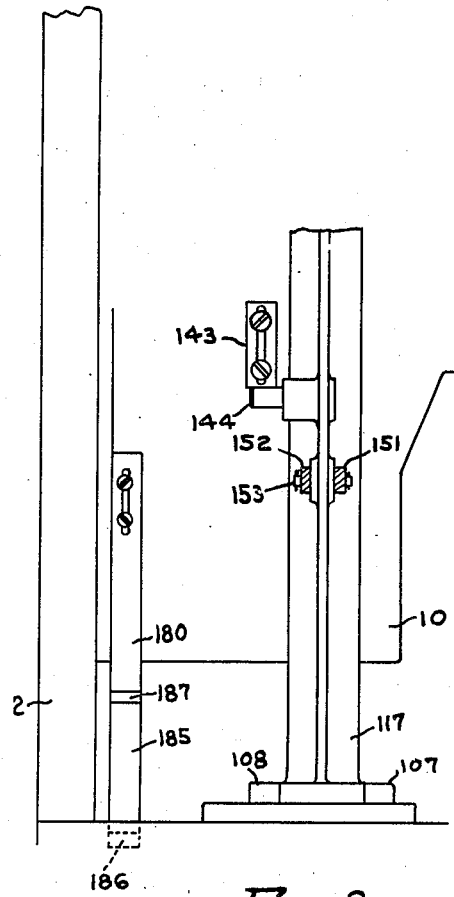
Fig. 8 is a rear view of strip finger arm showing the actuating cam on the main slide.

As the slide 10 descends an adjustable abutment member 143, Figs. 3 and 8, on the rear of said slide will contact with a stud 144 provided on the lever arm 117 and cause the said arm and its slide 106 to move downwardly against the action of spring 112. Inasmuch as the latch actuating member 139 is also attached to the slide 10, the latch member 135 is released from its influence and returns to its natural position, Fig. 6, by gravity so that when the projection 118 of the arm 117 passes by the latch 135 it will contact the said projection and prevent the spring 112 from moving the said arm upwardly until the proper time on the next upward movement of the main slide 10.

A cylinder and piston unit 145, Figs. 1, 2, 3 and 20, is suitably mounted on a member 146 provided by the base 1. A piston rod 147 extending through one end of the cylinder 148 has a tongue portion 149 on the end thereof carrying a pin 150. A pair of rods 151 and 152 are loosely mounted on the pin 150 at one end while the other end of said rods are loosely mounted on a pin 153, Figs. 6, 7 and 8, fastened in the lever arm 117. From the above description it will be apparent that movement of the piston rod 148 will cause the arm 117 to oscillate from the position of Fig. 6 to the position of Fig. 7 when fluid under pressure is admitted to the cylinder 148.

The cross members 6 and 7 have ways 154 and 155 respectively, Fig. 1, in which is slidably mounted a carriage 156 having a pair of bearings 157 and 158 depending from the front end thereof and a depending member 159, Fig. 2, at the rear end. The depending member 159 has a stud 160 on which is slidably mounted one arm 161, having an elongated slot 162, of a two armed lever 163 fulcrumed on a stud 164 that is carried by an arm 165 of a bracket 166 said bracket being suitably fastened to a cross member between the rear uprights 4 and 5.

The other arm 167, of the lever 163, Figs. 2 and 20, has an elongated slot 168 in which is slidably positioned a pin 169 fastened in an adjustable member 170. The member 170 is mounted on the screw threaded end of a piston rod 171 and is held in position by means of check nuts 172 and 173. The piston rod 171 extends through one end of a cylinder 174. From the above it will be seen that movement of the piston rod 171 will cause the carriage 156 to be moved back and forth a distance as provided by the adjustment of the member 170 on the piston rod 171.

Figure 10:
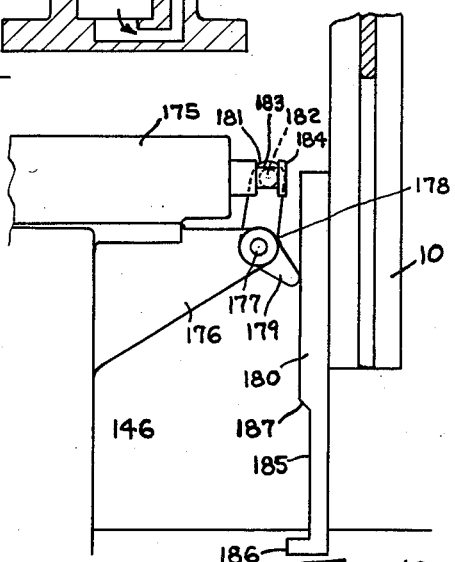
Fig. 10 is a view showing the cam on the main slide for actuating the control valve for the strip finger arm and transfer roll slide.
Figure 11:
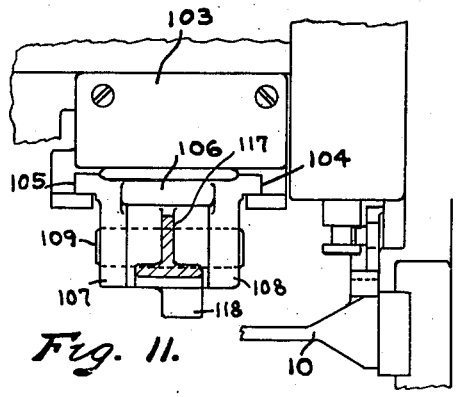
Fig. 11 is a plan view partially in section of the strip finger arm slide.

A reversing valve 175, Figs. 1, 3, 10 and 20, is mounted on the member 146 which has an arm 176 that carries a stud 177. A two armed lever 178, rockably mounted on the stud 177, one arm 179 of which is in contact with an actuating member 180, adjustably fastened on the rear of the main slide 10. The other arm 181 of the lever 178 has a stud 182 which engages in a circumferential groove 183 of a valve plunger 184. The actuating member 180 has a recessed portion 185, Fig. 10, and a projecting end portion 186. When the slide 10 moves upwardly the projecting end 186, of the actuating member 180, contacts with the end of the arm 179 rocking the lever 178 in an anti-clockwise direction which causes the valve plunger 184 to be moved to the left. As the slide 10 moves downwardly again the beveled portion 187 contacts with the end of the arm 179 and rocks the lever 178 in a clockwise direction which moves the valve plunger 184 to the right as shown in Fig. 10.

Referring now to Fig. 20 it will be seen that the reverse valve 175 is connected to the main valve 39 by means of a pipe 185 which enters the said reverse valve at port 186. The valve member 184 is provided with reduced portions 187, 188 and 189 which are separated by full size portions 190 and 191 while the full size end portions 192 and 193 form one end of the passage made by the reduced portions 187 and 189 respectively. With the valve member in the outer position as shown in Fig. 20 fluid under pressure entering port 186 passes around the reduced portion 187 and out port 194 to passage 195. From the passage 195 is a port 196 through which the fluid enters and flows around the reduced portion 189 and out of port 197 to pipe 198. Pipe 198 enters port 198' at one end of the cylinder 174 and the fluid under pressure normally maintains the piston and rod 171 in the position as shown. A branch lead 199 from the pipe 198 conducts fluid under pressure to a port 200 in the cylinder 148 and maintains the piston and rod 147 in the position as shown.

The exhaust fluid from the cylinder 148 is out of port 201 to pipe 202 which enters a port 203 in the valve 175. The exhaust fluid flows around the reduced portion 188 to port 204, pipe 205 and back to the sump or supply tank 27. The exhaust fluid from the cylinder 174 escapes out of port 206, pipe 207 to port 208 in the valve 175 and thence to port 204 and pipe 205 to the sump.

Referring now to Figs. 1 and 2 relative to the reciprocable slide 156 and its associated parts it will be noted that the bearings 157 and 158 have bearing surfaces 209, only the bearing surface of bearing 157 being shown, in which is rotatably mounted a shaft 210 that is held in said bearings by means of holding clips 211. By using holding clips to retain the transfer roll shaft 210 in position, it is possible to quickly and easily remove the roll 214 from the machine for cleaning purposes. Collars 212 and 213 are secured to the shaft 210 adjacent each of the bearings 157 and 158 to prevent axial movement of the said shaft. A transfer roll 214 of resilient material is also fastened to the shaft 210.

A cam 215, fastened to the upper side of the slide 156, is contacted by a cam roll 216 which is rotatably mounted on a stud 217 fastened on a lever 218 fulcrumed on a shaft 219, Figs. 1, 2 and 13. The shaft 219 is rotatably mounted in suitable bearings provided on a member 220. The member 220 is adjustably fastened to the crossmembers 6 and 7 thereby holding the upright members 2, 3, 4 and 5 in correct relation with each other.

A lever 221, fastened to the shaft 219, has an open end slotted portion 222 which slidably fits a stud 223 carried by a projecting portion 224 of a vertically reciprocable label supply receptacle generally designated as 225. The label supply receptacle by and of itself forms no part of the present invention as they are old and well known in the art it being sufficient to say that the said receptacle is carried on a member 226 having guide ways 227 and 228 which are slidably mounted in vertical ways 229 and 230 provided by the cross member 220.

From the above description of the label box 225 and its connections it is seen that as the slide 156 moves to the left, Fig. 2, the roll 216 will ride along the surface of the cam 215 until it reaches the inclined portion. Upon starting down the inclined portion of the cam 215 the weight of the label receptacle 225 will cause the roll 216 to follow the cam closely by means of the levers 218 and 221 which are fastened to the shaft 219 and when the slide reverses its direction of movement the cam 215 causes the label receptacle to raise up to the position shown in Fig. 2. The cam 215 is adjustable on the slide 156 to govern the label receptacle in relation to the picker fingers 73 to insure that the labels are pressed on said fingers with the right tension.

In setting up the machine it is desirable to reciprocate the slide 156 without having the label receptacle 225 move downwardly each time and therefore a lever 231 is secured to the shaft 219 while a second lever 232 having a locking face 233 is fulcrumed at 234 on a stud 235 carried by an upright portion of the cross member 220. When the operator wishes to have the label receptacle remain stationary during reciprocation of the slide 156, he swings the lever 232 by means of the handle 236 in a clockwise direction whereupon the locking face 233 contacts with the end of the lever 231 which, being secured to the shaft 219, causes the roll 216 to be raised away from the cam 215 in which position it is locked until the operator again manually moves the lever 232 in an anti-clockwise direction to allow the roll 216 to again contact the cam 215. The lever 232 rests against a pin 237 when in inoperative position.

As thus far described the machine is capable of putting on either one or two labels, i. e. body and neck labels, at each cycle but in many cases it is desirable to put on a third label or foil entirely around the mouth end of the bottle. As indicated in Fig. 2 the label receptacle 225 is arranged to hold three stacks of labels or two stacks of labels and one stack of foils.

In order that the drawings may clearly illustrate the invention the foiling mechanism control cylinder is merely indicated in Fig. 1 while the mechanism in its entirety is shown in Figs. 14 to 19 inclusive. Brackets 238 and 239, fastened to uprights 2 and 3 respectively, have extensions 240 and 241. As both of the foil wiping or forming mechanisms are of substantially the same construction only one of them will be described in detail while their operations and mode of functioning will be described in conjunction with their actuating means.

The extension 241, Figs. 14 and 15, has elongated slots 242 and 243, an interrupted bearing surface 244 and a rectangular groove 245. A member 246 having a tongue 247 is adjustably mounted on the surface 244 of the extension 241 and held in adjusted position by means of screws 248 and 249 which pass through the slots 242 and 243.

The member 246 has side walls 250 and 251 having ways 252 and 253 respectively. A wall 254 encloses the right hand end of the member 246 while a vertical projection 255 partially encloses the left hand end of the said member. A screw threaded adjustable stop 256, mounted in the projection 255, is held in adjusted position by means of a check nut 257.

Slidably mounted in the ways 252 and 253, of the member 246, are ways 258 and 259 of a roll carrying member 260. Gibs 261 and 262 maintain the roll carrying member in assembled relation to the member 246.

A depending substantially hollow boss 263 on the member 260 forms a housing for a spring 264 one end of which abuts the end wall 254 of the member 246 and maintains the roll carrying member 260 in its normal or left hand position against the adjustable stop 256.

On the upper side of the roll carrying member 260 is a pair of bearings 265 and 266 in which is mounted a shaft 267. Rotatably mounted on the shaft 267 is an arm 268 which is held in the raised position shown in Fig. 14 by means of a coil spring 269 one end of said spring being attached to the arm 268 and the other end being attached to the bearing 265 whereby movement of the said arm 268 in a clockwise direction will be against the action of said spring. It is to be noted that the compression spring 264 exerts a greater power than the coil spring 269 for the purpose which will presently be explained.

In a pair of hubs 270 and 271 on the end of the arm 268 is mounted a shaft 272 on which is rotatably mounted a roll carrier 273 having a roller 274 of resilient material, on a stud 275. A rearwardly extending portion 276 has a latching surface 277, Fig. 16. The roll carrier 273 is maintained in its normal latched position by means of a compression spring 278 carried in a recess 279 in the end of the arm 268. The arm 268 has a rectangular groove 280' on the upper side thereof in which is fulcrumed a latch 280 on a pin 281. The latch is held in locking position by means of a compression spring 282 which is supported in a recess 283 in the groove 280' of the arm 268, Figs. 14 and 16. Also in the groove 280' is a roller 284 rotatably mounted on a pin 285.

On the bracket 239 and above the roll carrying member 260 is a cylinder 286 having a piston 287 and piston rod 288, the end of said rod contacting the roller 284 carried by the arm 268. An extending arm 289, on the top of the cylinder 286, has an adjustable stop 290 which is held in adjusted position by means of a check nut 291.

Below the bracket 239 and on the upright 3 is another bracket 292 on which is adjustably mounted a valve body 293 having a bore 294, Fig. 20, within which is slidably mounted a valve member 296 having an extension 297 extending through the end of said body. The end of the extension 297 is slotted and a rockable member 298 is mounted in said slot on a pin 299. At the end of the rockable member 298 is mounted a roller 300 on a stud 301 while depending from said members is a portion 302 to which is attached one end of a spring 303 while the other end of the said spring is attached to the extension 297 whereby the action of the spring maintains the roller in its normal position as shown in Figs. 14 and 20. A pin 297' fitting in a key way 297", Fig. 20, prevents the turning of the extension 297 and thereby maintains the roll 300 in correct relation to a cam 304.

The cam 304 is adjustably mounted on the wiper slide 18 and is held in adjusted position by means of screws 305 and 306. The cam 304 can be mounted on the main slide 10 just as readily as on slide 18 but is shown on the latter by the way of illustration and not of limitation. Cam surfaces 307 and 308 in different planes are provided by the cam 304 for the purpose of actuating the valve member 296 through the roll 300. As shown in Fig. 14 the slide is in its uppermost position and is ready to descend but when the slide is ascending, the top of the cam 304 contacts with the roll 300 and rocks the member 298 about its fulcrum 299 so that the valve member is not moved longitudinally.

The valve member 296, Fig. 20, is provided with reduced portions 309, 310 and 311 and full sized portions 312, 313, 314 and 315. The valve body 293 is connected to the main valve 39 by means of a lead 316, cut into the pipe 68, entering at port 317 so that fluid under pressure is always maintained in the valve body 293 whenever the main valve 39 is opened to pressure.

The valve body 293 also has exhaust ports 318 and 319 and ports 320 and 321 said last named ports being connected by pipes 322 and 323 to the right hand and left hand cylinders 286 and 286' respectively. A branch lead 324 is cut into pipe 323 and connects said pipe with a port 325 in the said valve body. As shown in Fig. 20 the valve 293 is in its normal position at which time the fluid under pressure entering a port 317 is held within the area provided by the reduced portion 310 between the full size portions 313 and 314.

As the slide 18 descends the cam 304 forces the valve member 296 to the left by means of the cam surface 307 at which time the full size portion 313 opens the recessed band 326 so that fluid under pressure will flow from the entrance port 317 to port 321, pipe 323, and port 327 in the left hand cylinder 286, the area of the port being adjustably restricted by means of a valve 328, Fig. 14. While the movement of the valve member 296 to the left opens up the port 321 to pressure it does not move far enough to allow fluid under pressure to enter port 320 as the full size portion 314 does not uncover the band 329 and neither is the by-pass exhaust port 325 uncovered by the full size portion 312.

With fluid under pressure entering the rear end of the left hand cylinder 286 the piston 287 is caused to move to the right, Fig. 14. As the piston 287 moves to the right the piston rod 288 rocks the arm 268 about its fulcrum 267 against the action of the spring 269 until the resilient roll 274 is in the position as shown in Fig. 17 at which time a cam roll 330, mounted on a stud 331 on the arm 268, contacts a cam 332 mounted on the member 246.

When the strip or presser finger 123, Fig. 14, presses the foil 333 on the bottle A the ends of the foil are forced downward so that as the roll 274 moves in an arc to the position shown in Fig. 17 the said foil will be partially wrapped around the bottle.

As the piston 287 continues to move to the right the arcuate motion of the roller 274 is controlled by the shape of the cam 332 and therefore the continued movement now causes the roll carrying member 260 to move to the right against the action of the spring 264 until the roll 274 reaches the position shown in Fig. 18 which is very nearly the end of the movement of the piston rod 288. It is to be noted here that a depending portion 335 on the roll carrier 273 is almost in contact with a trip member 336 which is suitably fastened to the under side of the cam 332.

As the piston rod 288 reaches the end of its stroke the depending portion 335 abuts the trip member 336 and causes the roll carrier latch surface 277 to rock the latch 280 and release the roll carrier 273 so that it will assume the position shown in Fig. 19 which position it will maintain relative to the arm 268 until it is returned to the normal position shown in Figs. 14 and 16.

When the piston 296 reaches the end of its stroke the slide 18 has moved downward so that the cam surface 308 is now in contact with the roll 300 and has moved the valve member 296, Fig. 20, further to the left at which time the full size portion 314 is moved far enough to open the band 329 so that the full flow of fluid under pressure is admitted to port 320. From port 320 the fluid under pressure flows through the pipe 322 to the right hand end of the cylinder 286' so that the resilient roll 274' goes through the same motions as described for roll 274.

Movement of the valve member 296 to the left as above outlined causes the full sized portion 314 to shut off the band 329 from communicating with the port 323 at the same time the full size portion 312 opens the exhaust port 325 and allows the fluid in the cylinder 286 to return to the sump by the way of port 319. As soon as the port 325 is opened to exhaust the slide 260 starts moving to the left, Fig. 14, under the impulse of the spring 264, the rate of the return movement being controlled by adjustable valve 328.

When the cylinder 286 is opened to exhaust, the valve 328 maintains a volume of fluid which the spring 264 forces out of said cylinder. The force necessary to discharge the fluid through the valve 328 being great enough to maintain the cam roll 330 on the cam 332 until the slide 260 abuts the stop 256 at which time the spring 269 will raise the arm 268 to the position shown in Fig. 14 as the fluid continues to exhaust from the cylinder.

As the fluid becomes exhausted from the cylinder 286 the piston rod moves to the left and gradually allows the spring 269 to raise the arm 268 to the position shown in Fig. 14. As the said arm raises into its normal position the tail end of the latch 280 abuts the adjustable stop 290 which rocks the said latch enough to allow the spring 278 to return the roll carrier 273 from the position shown in Fig. 19 to that shown in Figs. 14 and 16 with the locking surface 277 held by the latch 280.

The cam surface 308 holds the valve member 296 to the right long enough for the roll 274' to go through substantially the same motions as roll 274 went through in wrapping the left half of the foil around the bottle. When the cam roll 300 reaches the end of the cam 304 a spring 337 in the valve chamber 294 forces the valve member 296 to the right shutting off the fluid under pressure from port 317 and opening port 320 to exhaust port 318 whereby the fluid in the right hand cylinder can return to the sump. With the valve 296 in the position shown in Fig. 20 both right and left hand cylinders are open to exhaust and the rolls in their normal position as shown in Fig. 14.

Mounted between the frame members 2 and 3, Figs. 1 and 2, is a container 338 in which a supply of adhesive is maintained. A supply roll 339 is mounted on a shaft 340 which is rotatably carried in bearings on the ends of the container. The shaft has a gear 341 mounted on one end thereof. An arm 342 suitably fastened to the upright 3 has a gear 343, which meshes with the gear 341, and a sprocket 344. A belt or chain 345 gears the sprocket 344 with the sprocket 38, Fig. 2, whereby the supply roll 339 is rotated.

In operating this machine the operator places a bottle on the holder 101 and steps on the treadle 54 to move the main valve 39 to the position as shown in Fig. 20. As long as the operator maintains the treadle depressed the machine will go through its cycle over and over again but the instant he takes his foot off of the treadle 54 the spring 56 will move the valve member 40 to the right, Fig. 20, thereby cutting off the supply port 345 with the full size portion 346, of the valve member 40, and stopping the flow of fluid from the pump to the rest of the system.

Referring now to Fig. 21 it will be noted that the supply port 345 intercepts the valve chamber 347 which is also intercepted by cross passages 348 and 349. The last named passages lead into chambers 350 and 351 which have outlet ports 352 and 353 respectively. The outlet port 352 being connected to the reverse valve 175 by means of the pipe 185 while the port 353 is connected to the reverse valve 57 by means of the pipe 68.

Within the chambers 350 and 351 are adjustable throttle valves 354 and 355 whereby the rate of movement of the various mechanisms can be readily adjusted to suit the prevailing conditions.

With the treadle 54 depressed and the valve 39 connecting the system directly with the pump, the fluid under pressure will flow out of port 353 to pipe 68 and reverse valve 57 which, as the slides 10 and 18 are in their starting or lower position, is in the position shown in Fig. 20. The fluid under pressure enters the reverse valve 57 at port 356 and passes around a reduced portion 357 of the piston valve 65 and out of port 358. The port 358 is connected by the pipe 69 to port 359 in the bottom of cylinder 13 at which time the slides 10 and 18 start to move upwardly as a unit due to the fact that they are held together by means of the latch 75.

The said slides move upward until the wiper finger arms 83 and 84 are oscillated to a vertical position by means of the cam rollers 89 and 90 contacting with the cams 99 and 100. When the wiper fingers 87 and 88 are closed over the bottle A they are in the dotted line position shown in Fig. 1. Just as the fingers close over the bottle the latch 75 is rocked by the cam 81 and releases the wiper slide 18 so that it starts its return or downward movement against the action of the dash pot 21 before the main slide 10 reaches the limit of its upward movement.

During the descent of the wiper slide 18 the resilient wipers 87 and 88 pass over the label or labels and firmly affixes it or them to the bottle. As the said wiper slide nears the end of its descending stroke, the wiper finger arms 83 and 84 are again oscillated to open them to the full line position of Fig. 1 by means of the cam rollers 89 and 90 and cams 97 and 98.

At the start of the upward movement of the slide 10 a label or labels is or are reposing on the picker fingers 73 and 74 and the strip or presser finger 123 is holding the said label or labels on the bottle. When the slide 10 starts upwardly the label is stripped from the said picker fingers by the said strip finger.

As above noted the strip or presser finger 123 is pressed firmly against a bottle when the slides are in their lowermost position. As the presser finger arm 117 is latched to the base 1 there is no movement to the presser finger until after the wiper slide 18 has caused the wipers 87 and 88 to pass over the label and affix it to the bottle. As soon as the wipers have performed their function the stop member 141, on the main slide 10, contacts with the latch 137 and releases the presser arm 117 so that it moves vertically upward due to the action of the spring 112 on the slide 110 which carries the said arm 117.

As the wiper slide 18 descends the cam 304 on said slide causes the actuation of the valve member 296, through the extension 297 and cam roller 300, thereby causing the left hand foil roll 274 to start through its cycle and then the right hand foil roll 274' to start through its cycle so that during the descent of the wiper slide 18 the foil 333 is wiped around the end of the bottle at the same time that the body and neck labels are wiped in place.

The main slide 10 continues upward until the end portion 186 of the actuating member 180 contacts with the shifting lever 178 and causes the valve plunger 184 to be moved. Movement of the valve plunger 184 allows fluid under pressure from the main valve 39 to enter the upper end of the cylinder 174 and thereby cause the piston rod 171 to move downwardly and rock the arm 161 in an anti-clockwise direction. Movement of the said arm causes the transfer roll slide 156 to move to the left and as the main slide 10 has reached the top of its stroke the picker fingers 73 and 74 are in the dotted line position shown in Fig. 2. As the transfer roll slide 156 moves to the left the resilient transfer roll 214 deposits a film of adhesive to the said picker fingers.

Just after the transfer roll 214 leaves the picker fingers 73 and 74 the cam 215 on the upper side of said slide 156 allows the label receptacle 225 to move downwardly and deposit a label or labels on said picker fingers.

Actuation of the valve plunger 184 as above pointed out also directs fluid under pressure to the right hand end of the cylinder 145, Fig. 2, which causes the piston rod 147 to be moved to the left. Upon movement of the said piston rod to the left the presser finger arm 117, which has moved the fingers 123 vertically away from the bottle as above noted, is oscillated in an anticlockwise direction just prior to the descent of the label receptacle 225.

As the transfer roll slide 156 continues to the left a cam 360, Fig. 2, on said slide contacts with and depresses a rod 361, guided in brackets 362 and 363 fastened to the upright 3, against the action of a spring 364. One end of the said spring abuts the bracket 363 and the other end abuts a collar 365 fastened to the rod 361. A second collar 366 is fastened to the rod 361 below the bracket 363 to hold the said rod in position and maintain the proper spring tension on the spring 364.

The lower end of the rod 361 abuts the member 61 so that when the said rod is depressed by the cam 360 the member 61 is rocked about its fulcrum and shifts the reverse valve 57 and cuts off the fluid under pressure from the main valve 39 and opens the main slide cylinder 13 to exhaust by the way of port 367 in the reverse valve 57. The rate of descent of the main slide is controlled by means of a needle valve 368, Fig. 20, in the exhaust port 367.

The transfer roll slide 156 continues its movement to the left until the transfer roll 214 abuts the constantly rotating supply roll 339 and receives a fresh supply of adhesive. The position of the transfer roll 214 in relation to the supply roll 339 is governed by the adjustment of the member 170 on the piston rod 171 whereby the desired degree of contact between the said rolls is maintained. Just about the time that the said transfer roll and supply roll come in contact with each other the inclined portion 187 of the actuating member 180, on the descending slide 19, contacts the arm 179 of the lever 178 and rocks it in a clockwise direction. Rocking the lever 178 moves the reverse valve member 184 to the position shown in Fig. 20 at which time fluid under pressure enters the left hand end of the presser arm cylinder 148 and the lower end of the transfer roll slide cylinder 174 whereupon the transfer roll slide 156 moves to the right, Fig. 2, and the cam 215 on said slide moves the label receptacle 225 vertically upward in time to allow the now advancing strip or presser finger arm 117 to position the presser fingers directly over the bottle.

The presser finger arm 117 is now in a substantially vertical position and the abutment member 143 on the descending slide contacts with the stud 144 on the arm 117 and moves the said arm and its slide 106 vertically downward against the action of the spring 112 until the projection 118 on the arm 117 passes below the latching arm 136 of the latch member 135. When the projection 118 gets below the latching arm 136 the said arm is swung by gravity in a clockwise direction to contact with the said projection and prevent upward movement of the slide 106 until the next upward movement of the main slide 10.

As the main slide 10 continues its downward movement the wiper slide latch 75 snaps into the slot 80 of the wiper slide and locks the two slides 10 and 18 together at the same time the abutment member 70 rocks the member 60 and shifts the reverse valve 57 to the position as shown in Fig. 20 whereupon the above cycle is repeated unless the operator removes his foot from the treadle 54 in which case the spring 56 will move the valve member 40 and block off the entrance port 345 so that the fluid under pressure from the pump will be cut off from the hydraulic units of the machine and will escape through a relief valve 369 in the pressure line.

From the above description it will be seen that a machine requiring the minimum number of wearing parts with the maximum efficiency has been produced whereby it is possible to label bottles semi-automatically so long as the operator maintains the foot on the treadle.

It is also notable that the machine stops automatically as soon as the operator leaves it thereby stopping a waste of labels which would be continuously deposited on the picker fingers at each cycle of the machine were the machine to be left running.

Another notable feature of this machine is that the various mechanisms are interlocked so as to be interdependent as to their several functions whereby a smooth running and extremely accurate cycle of operation is possible.

A further notable feature of this machine is that by using fluid under pressure as the motive power for the various units a very quiet running machine is produced.

I claim:

1. In a labeling machine, a reciprocable picker slide, an oscillatable strip finger, and means responsive to the movement of said slide for oscillating said finger.

2. In a labeling machine, a reciprocable picker slide, a slide carrying a strip finger, means to move said finger slide, and means temporarily to prevent said last named means from moving said finger slide until released by said picker slide.

3. In a labeling machine, a reciprocable picker finger slide, a slide carrying a strip finger, means to move said strip finger slide, lock means to hold said strip finger slide in one position, and means responsive to the movement of the picker finger slide to release said lock means.

4. In a labeling machine, a reciprocable picker finger slide, a slide carrying a strip finger, resilient means to move said strip finger in one direction, and means responsive to the movement of said first named slide to move said last named slide against the action of said resilient means.

5. In a labeling machine, a reciprocable picker finger slide, a slide carrying a strip finger, resilient means to move said last named slide in one direction, means responsive to the movement of the picker finger slide to move the strip finger slide in another direction, and means to automatically lock said strip finger slide in position at the end of its movement.

6. In a labeling machine, a picker finger slide, means to reciprocate said slide, an oscillatable strip finger, a slide on which said finger is mounted, means responsive to the movement of said picker finger slide to move said strip finger vertically upward, and means responsive to the same movement of the picker finger slide to oscillate said strip finger.

7. In a labeling machine, a reciprocable picker slide, a slide providing a strip finger, resilient means to move said finger slide in one direction, means to prevent said resilient means from functioning, and means responsive to the movement of said picker slide to actuate said last named means whereby said resilient means will function to move said finger slide.

8. In a labeling machine, a reciprocable picker finger slide, a strip finger, a reciprocable slide on which said finger is mounted, locking means to hold said strip finger slide in one position, resilient means to move said strip finger slide in one direction, and means responsive to the movement of the picker finger slide to actuate said locking means whereby said resilient means will move said strip finger slide.

9. In a labeling machine, a reciprocable picker finger slide, an oscillatable strip finger, a reciprocable slide on which said finger is mounted, locking means to hold said strip finger in one position, resilient means to move said strip finger in one direction, means responsive to the movement of the picker finger slide to actuate said locking means whereby said resilient means will move said strip finger slide, and means responsive to the movement of said picker finger slide for oscillating said strip finger.

10. In a labeling machine, a reciprocable picker finger slide, means to reciprocate said slide, picker fingers on said slide, reciprocable means to supply adhesive to said fingers, hydraulic means to actuate said last named means, and means responsive to the reciprocation of said picker finger slide to actuate said hydraulic means.

11. In a labeling machine, a picker finger slide, means to reciprocate said slide, picker fingers on said slide, means to supply adhesive to said fingers, means to reciprocate said supply means, and means responsive to the reciprocation of said picker finger slide to actuate the supply reciprocating means.

12. In a labeling machine, a picker finger slide, means to reciprocate said slide, picker fingers on said slide, means to supply adhesive to said fingers, means to reciprocate said supply means, and means responsive to the reciprocation of said supply means to reverse the direction of movement of said picker finger slide.

13. In a labeling machine, a reciprocable label holder, a picker finger slide, means to reciprocate said slide, and means to reciprocate said label holder in response to the reciprocation of said slide.

14. In a labeling machine, a reciprocable label holder, a picker finger slide, means to reciprocate said slide, picker fingers on said slide, means to supply adhesive to said fingers, means responsive to the reciprocation of said slide to actuate said supply means, and means responsive to the movement of said supply means for reciprocating said label holder.

15. In a labeling machine, a strip finger, means to oscillate said finger, a picker finger slide, means to reciprocate said slide, picker fingers on said slide, means to supply adhesive to said fingers, means responsive to the reciprocation of said picker finger slide to actuate said supply means, means responsive to the movement of said supply means to reverse the direction of movement of the picker finger slide, and means responsive to the reverse movement of said last named slide to oscillate said strip finger.

16. In a labeling machine, a strip finger, means to oscillate said finger, a slide on which said finger is mounted, a picker finger slide, means to reciprocate said slide, picker fingers on said slide, means to supply adhesive to said fingers, means responsive to the reciprocation of said picker finger slide to actuate said supply means, means responsive to the movement of said supply means to reverse the direction of movement of the picker finger slide, means responsive to the reverse movement of the picker finger slide to oscillate said strip finger, and further means responsive to the said reverse movement of the picker finger slide for moving the strip finger vertically downward.

17. In a labeling machine, a reciprocable picker finger slide, a reciprocable wiper slide, means to lock said slides together, means to reciprocate said slides, and means responsive to the movement of said slides to release the wiper slide whereby the said wiper slide will move in an opposite direction to the picker finger slide.

18. In a labeling machine, a reciprocable wiper slide, pivotally mounted wipers in open position on said slide, means to reciprocate said slide, means responsive to the reciprocation of said slide to oscillate said wipers into closed position, and means to lock said wipers in said closed position.

19. In a labeling machine, a reciprocable wiper slide, pivotally mounted wipers in closed position on said slide, means to lock said wipers in closed position, means to reciprocate said slide, and means responsive to the reciprocation of said slide to release said locking means and oscillate said wipers into open position.

20. In a labeling machine, a reciprocable picker finger slide, a reciprocable wiper slide, means to lock said slides together, means to reciprocate said slides, means responsive to the movement of said slides to release the wiper slide whereby the said wiper slide will move in an opposite direction to the picker finger slide, means to reverse the direction of movement of the picker finger slide, and means responsive to the said reverse movement to lock said slides together.

21. In a labeling machine, a reciprocable picker finger slide, a reciprocable wiper slide, means to lock said slides together, hydraulic means to reciprocate said slides in an upward direction, means responsive to the upward movement of said slides to release the wiper slide whereby said wiper slide will start downward while said picker finger slide continues upward.

22. In a labeling machine, a reciprocable picker finger slide, a reciprocable wiper slide, means to lock said slides together, hydraulic means comprising a cylinder and piston to move said slides in an upward direction, mechanical means responsive to the upward movement of said slides to actuate said locking means whereby said wiper slide ceases its upward movement and starts downward, and hydraulic means to control the rate of downward movement of said wiper slide while said picker finger slide continues to move upwardly.

23. In a labeling machine, a reciprocable slide, means to reciprocate said slide, a foil wrapping mechanism, and hydraulic means including a valve responsive to the reciprocation of said slide to actuate said mechanism.

24. In a labeling machine, a reciprocable picker finger slide, a reciprocable wiper slide, means to lock said slides together, a single hydraulic means for moving said slides in one direction, means responsive to the movement of said slides to actuate said locking means whereby said wiper slide ceases movement in the one direction and starts movement in another direction, a foiling mechanism, hydraulic means to actuate said mechanism, and a cam on said wiper slide to actuate said last named means.

25. In a labeling machine, a wrapping mechanism comprising two oscillatable wiping members, in opposed relation to each other, slides for said members, and means to oscillate said members and move said slides toward each other.

26. In a labeling machine, a wrapping mechanism comprising two oscillatable wiping members in opposed relation to each other, slides for said members, and hydraulic means to oscillate said members and move said slides toward each other, said means comprising cylinders and pistons.

27. In a labeling machine, a wrapping mechanism comprising two oscillatable wiping members in opposed relation to each other, slides for said members, means to oscillate said members and move said slides in one direction, and means to move said slides in another direction.

28. In a labeling machine, a wrapping mechanism comprising two oscillatable wiping members in opposed relation to each other, slides for said members, resilient means to hold said slides in one position and hydraulic means to move said slides to another position.

29. In a labeling machine, a wrapping mechanism comprising two oscillatable wiping members in opposed relation to each other, slides for said members, resilient connecting means between said slides and said members to hold said members in one position, means to hold said slides in one position, and means to oscillate said members against said resilient means and move said slides against said holding means.

30. In a labeling machine, a wrapping mechanism comprising an oscillatable arm, a wiper on said arm, a slide on which said arm is mounted, means to hold said arm in one position, means to move said arm and slide, and means whereby the free oscillatory movement of said arm is stopped in a predetermined position and then the slide is moved to position the arm in a second predetermined position.

31. In a labeling machine, a wrapping mechanism comprising an oscillatable arm, a wiper on said arm, a slide on which said arm is mounted, means to hold said arm in one position, hydraulic means to move said arm and slide, and cam means whereby the free oscillatory movement of said arm is stopped in a predetermined position and then the said slide is moved to position the said arm in a second predetermined position.

32. In a labeling machine, a wrapping mechanism comprising an oscillatable arm, a wiper on said arm, means to lock said wiper in operative position on said arm, means to oscillate said arm, and means to actuate said locking means whereby said wiper will move to inoperative position.

33. In a labeling machine, a wrapping mechanism comprising an oscillatable arm, a wiper on said arm, means to lock said wiper in operative position on said arm, a slide on which said arm is mounted, means to guide the oscillatory movement of said arm, and means to first oscillate said arm into contact with said guiding means and then move said slide so that said arm has a combined longitudinal, oscillatory movement.

34. In a labeling machine, a wrapping mechanism comprising an oscillatable arm, a wiper on said arm, means to lock said wiper in operative position on said arm, a slide on which said arm is mounted, means to guide the oscillatory movement of said arm, means to first oscillate said arm into contact with said guiding means and then move said slide so that said arm has a combined longitudinal, oscillatory movement, and means to move said wiper into inoperative position on said arm at the end of said movement.

35. In a labeling machine, a wrapping mechanism comprising an oscillatable arm, a wiper on said arm, means to lock said wiper in operative position on said arm, a slide on which said arm is mounted, means to guide the oscillatory movement of said arm, means to first oscillate said arm into contact with said guiding means and then move said slide so that said arm has a combined longitudinal, oscillatory movement, means to move said wiper into inoperative position on said arm at the end of said movement, and means to return said slide and arm to rest position.

36. In a labeling machine, a wrapping mechanism comprising an oscillatable arm, a wiper on said arm, means to lock said wiper in operative position on said arm, a slide on which said arm is mounted, means to guide the oscillatory movement of said arm, means to first oscillate said arm into contact with said guiding means and then move said slide so that said arm has a combined longitudinal, oscillatory movement, means to move said wiper into inoperative position on said arm at the end of said movement, means to return said slide and arm to rest position, and means to actuate said locking means whereby said wiper will return to operative position when said arm returns to rest position.

37. In a labeling machine, a reciprocable picker slide, a movable strip finger, and means responsive to the movement of said slide for moving said finger.

HECTOR R. BERARD.